(12) United States Patent  (10) Patent No.: US 7,756,602 B2
Koempel et al.  (45) Date of Patent: Jul. 13, 2010

(54) VEHICLE ENTERTAINMENT AND GAMING SYSTEM

(75) Inventors: Jeremy Koempel, Pittsburgh, PA (US); Seung Chan Lim, Pittsburgh, PA (US); Michael McManus, Oakdale, PA (US)

(73) Assignee: Panasonic Automotive Systems Company of America division of Panasonic Corporation of North America, Peachtree, GA (US)

( * ) Notice: Subject to any disclaimer, the term of this patent is extended or adjusted under 35 U.S.C. 154(b) by 409 days.

(21) Appl. No.: 11/818,493

(22) Filed: Jun. 14, 2007

(65) Prior Publication Data

US 2008/0311983 A1 Dec. 18, 2008

(51) Int. Cl.
*G06F 7/00* (2006.01)
(52) U.S. Cl. .................. 700/213; 700/90; 318/567; 318/568.1; 318/568.16; 318/568.18; 318/568.25; 340/988; 340/995.1; 340/995.25; 340/995.28; 382/104; 701/36; 701/45
(58) Field of Classification Search .................. 700/213
See application file for complete search history.

(56) References Cited

U.S. PATENT DOCUMENTS

| 6,738,698 | B2* | 5/2004 | Ichihara et al. ............... 701/36 |
| 6,946,978 | B2* | 9/2005 | Schofield ............... 340/995.28 |
| 7,046,171 | B2* | 5/2006 | Yanai ...................... 340/995.1 |
| 7,214,133 | B2* | 5/2007 | Jen et al. ...................... 463/42 |
| 7,670,220 | B2* | 3/2010 | Chudley et al. ................ 463/6 |
| 2001/0029613 | A1* | 10/2001 | Fernandez et al. .......... 725/105 |
| 2002/0117340 | A1* | 8/2002 | Stettner ...................... 180/169 |
| 2002/0184236 | A1* | 12/2002 | Donath et al. ............ 707/104.1 |
| 2003/0063756 | A1* | 4/2003 | Geerlings et al. ............. 381/86 |
| 2003/0212536 | A1* | 11/2003 | Wang et al. .................... 703/6 |
| 2004/0193347 | A1* | 9/2004 | Harumoto et al. ............. 701/45 |
| 2005/0110348 | A1* | 5/2005 | Hijikata et al. ............. 307/10.1 |
| 2005/0177252 | A1* | 8/2005 | Chernoff et al. .............. 700/17 |
| 2005/0232469 | A1* | 10/2005 | Schofield et al. ............ 382/104 |
| 2005/0277455 | A1* | 12/2005 | Chudley et al. ................ 463/6 |
| 2006/0125919 | A1* | 6/2006 | Camilleri et al. ............ 348/148 |
| 2006/0148546 | A1* | 7/2006 | Inoue et al. .................... 463/6 |
| 2006/0190822 | A1* | 8/2006 | Basson et al. ................ 715/700 |
| 2007/0097832 | A1* | 5/2007 | Koivisto et al. ................ 369/63 |
| 2008/0110986 | A1* | 5/2008 | Quinn ........................ 235/411 |
| 2008/0169929 | A1* | 7/2008 | Albertson et al. ......... 340/573.1 |
| 2009/0081923 | A1* | 3/2009 | Dooley et al. ................ 446/456 |

* cited by examiner

*Primary Examiner*—Khoi Tran
*Assistant Examiner*—Jonathan Sample
(74) *Attorney, Agent, or Firm*—Laurence S. Roach

(57) ABSTRACT

An entertainment system is for a vehicle and includes a vehicle environment sensor apparatus that captures data indicative of the vehicle's environment and that generates a vehicle environment data feed. A video game console is electronically coupled to the vehicle environment sensor apparatus and has an application program interface. The video game console receives the vehicle environment data feed, operates a game medium, and generates a video output signal based on both the game medium and the vehicle environment data feed. At least one controller is communicatively coupled to the video game console and directs the operation of the game medium. A display unit communicatively coupled with the application program interface receives the video output signal and displays images dependent upon the video output signal.

20 Claims, 6 Drawing Sheets

VEHICLE ENTERTAINMENT AND GAMING SYSTEM

BACKGROUND OF THE INVENTION

1. Field of the Invention

The present invention relates to vehicle entertainment systems, and, more particularly, vehicle entertainment systems including gaming capability.

2. Description of the Related Art

Many vehicles, such as cars, trucks, vans and recreational vehicles (RVs) are equipped with an entertainment system capable of playing audio/video media, such as DVD movies. Although these systems have made vehicle travel more pleasant for passengers, it may be desirable to have other forms of entertainment available. For instance, passengers often enjoy playing games while traveling in a vehicle. Such games may include video games played on portable-handheld video game units. However, traditional portable gaming units allow only a single player and, thus, do not promote family interaction. These games are also limited in their presentation by the video game software and, thus, isolate the player from the vehicle, the surrounding environment (including passing landmarks and landscape) and other occupants. Other games include traditional family games such as "I Spy," "Slug Bug" and "Spot the License Plate," all of which involve spotting objects in the landscape passing by the vehicle. These games promote passenger interaction and interest in the surrounding landscape, but may not capture the attention of the technologically savvy passenger.

Accordingly, a need remains for a vehicle entertainment system that captures the technological interest of the passenger while promoting interaction between and interest in the vehicle passengers, vehicle location and vehicle environment.

SUMMARY

The present invention provides an entertainment and gaming system and related components for use in a vehicle. The entertainment and gaming system receives data feeds from other systems on the vehicle that gather data regarding the location and environment of the vehicle. Such location and environment data, which may include video data, geographic data, audio data, navigation data, and weather-related data, to name a few, has traditionally been used only for operation of the vehicle or for presentation of information to the user. According to the present invention, the entertainment and gaming system may incorporate the location and environment data feeds into the display of the games/entertainment, and may factor the data feeds into the processing of the games/entertainment. For example, how the entertainment and gaming system responds to inputs from the user and processes the games/entertainment may depend upon the content of the data feeds. Thus, while the user is gaming or otherwise being electronically entertained, the user may interact with, be aware of, and learn about the environment and location through which the vehicle is traveling. For purposes of incorporating location and environment data into the games/entertainment, the system may include sensors for capturing location and environment data that has not traditionally been captured for utilitarian purposes.

In one particular aspect, the invention provides an entertainment system for a vehicle. The system includes a vehicle environment sensor apparatus that captures data indicative of the vehicle's environment and that generates a vehicle environment data feed. A video game console is electronically coupled to the vehicle environment sensor apparatus and has an application program interface. The video game console receives the vehicle environment data feed, operates a game medium, and generates a video output signal based on both the game medium and the vehicle environment data feed. At least one controller is communicatively coupled to the video game console and directs the operation of the game medium. A display unit communicatively coupled with the application program interface receives the video output signal and displays images dependent upon the video output signal.

In another aspect, the entertainment system includes means for capturing and transmitting environmental data related to the vehicle's environment. An electronic module is electronically coupled to the capturing means. The electronic module receives the environmental data, operates an entertainment medium, and generates a video output signal based on both the entertainment medium and the environmental data. A display unit is communicatively coupled with the electronic module. The display unit receives the video output signal, and displays images dependent upon the video output signal.

In yet another aspect, the invention provides a method of operating an entertainment system for a vehicle, including capturing images of the vehicle's environment. An entertainment medium including graphic image data is provided. The environmental images and the graphic image data are combined to form a composite video output signal. Composite graphic images that are dependent upon the composite video output signal are displayed.

An advantage of the present invention is that existing sources of environmental and location data on the vehicle may be used to enhance the operation of the gaming/entertainment system.

Another advantage is that the user may remain aware of and learn about the environment surrounding the vehicle, even while the user plays a video game or watches video entertainment.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
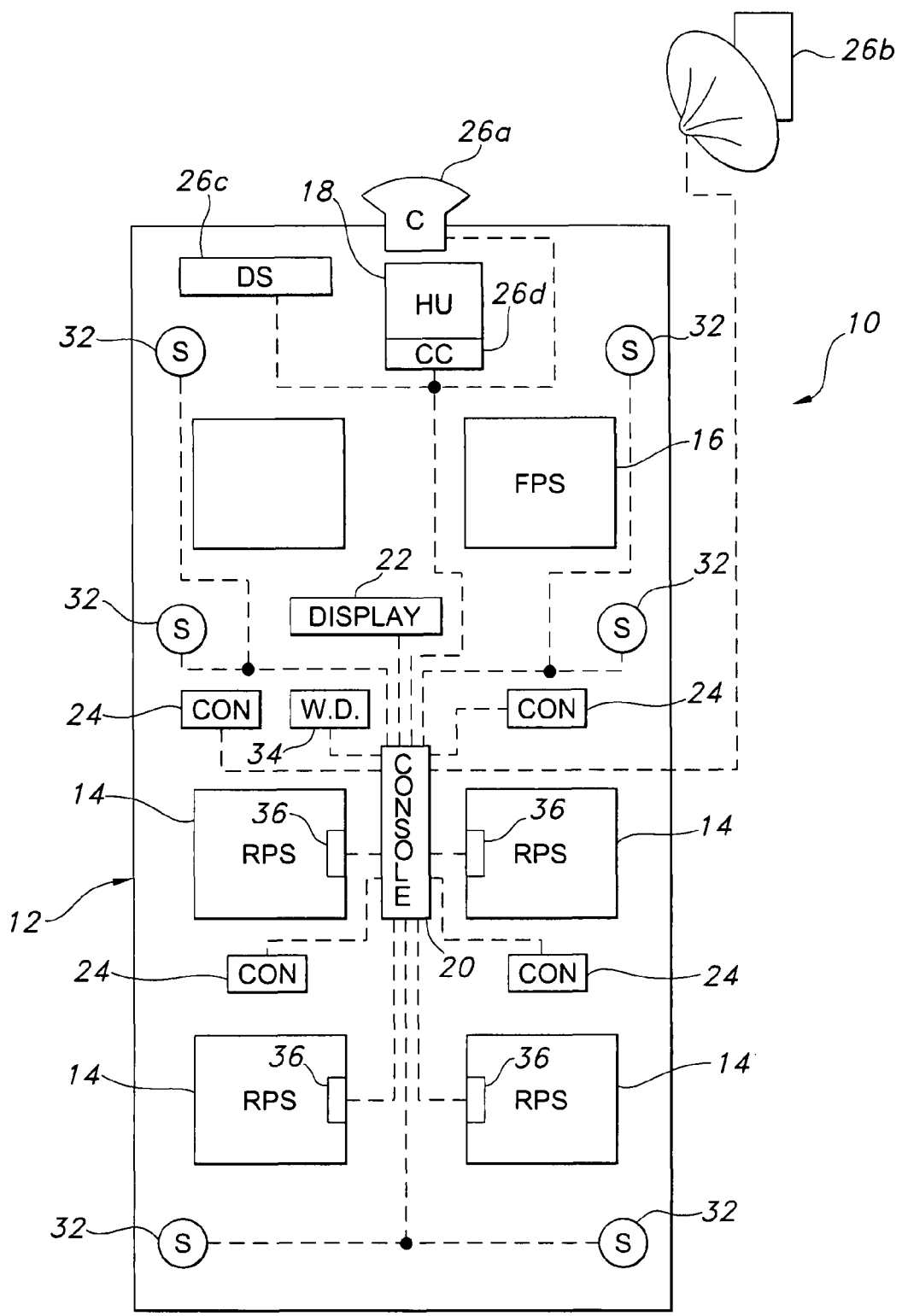
FIG. 1 is a block diagram of a vehicle having an entertainment system in accordance with one embodiment of the present invention.

Corresponding reference characters indicate corresponding parts throughout the several views. Although the drawings represent embodiments of the present invention, the drawings are not necessarily to scale and certain features may be exaggerated in order to better illustrate and explain the present invention. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Referring first to FIG. 1, entertainment system 10, as installed in vehicle 12 according to one embodiment of the present invention, will now be described. Vehicle 12 includes rear passenger seats 14 and front passenger seat 16. Entertainment system 10 generally includes an electronic module 20, visual display unit 22, game controllers 24, vehicle environment sensor apparatus 26 (FIG. 2) and audio unit 32. In one embodiment, electronic module 20 is in the form of a video game console.

Figure 2:
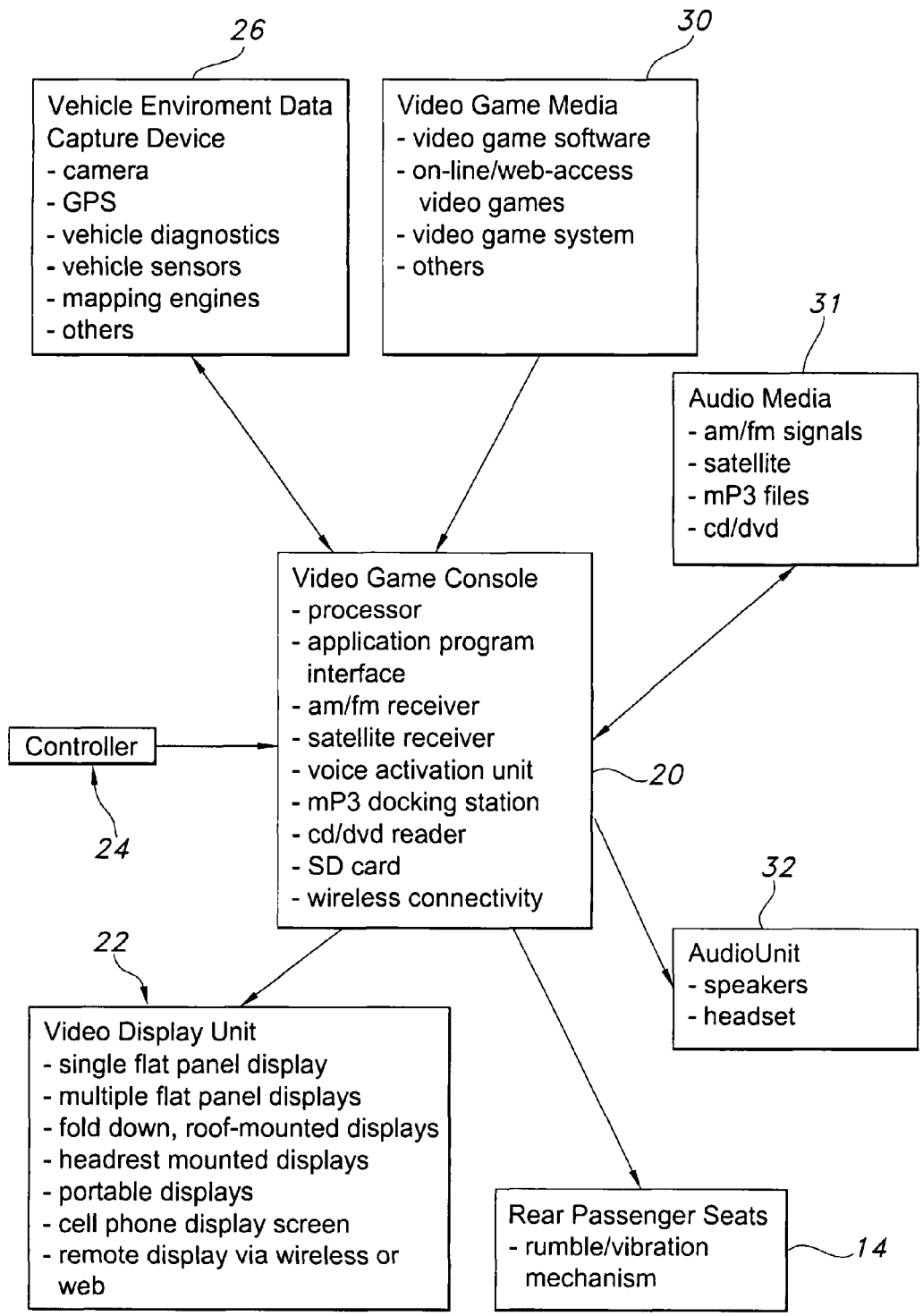
FIG. 2 is a block diagram illustrating the communications between the components of the entertainment system of FIG. 1.

Video game console 20 may be positioned near rear passenger seats 14 for easy access by rear passengers, but may also be positioned in alternative locations. Video game console 20 is adapted to receive, read and/or operate video game software modules, referred to herein as "video game media." Video game media may be in any known form including, for example, video game software stored on storage devices such as CDs, DVDs, hard drives or other software storage devices. Video game media may also be in the form of on-line/internet access video games. Alternatively, video game console 20 may be adapted to electronically couple to external game systems. Video game console 20 may include a processor and an application program interface which cooperate to read and operate the video game media 30 (FIG. 2) and communicate with the other components of entertainment system 10. As discussed in further detail below, the application program interface interfaces the video game media with the other components of entertainment system 10 to produce a virtual world video game. Video game console 20, and the application program interface in particular, may also be directly adapted to receive audio/visual media 31, such as am/fm radio signals, satellite radio or global positioning system (GPS) signals, and audio storage media such as MP3 files, CDs and DVDs. Accordingly, video console 20 may be equipped with an am/fm receiver, satellite receiver, MP3 or iPod® docking station, secure digital (SD) card port and/or CD/DVD reader (FIG. 2). Alternatively, entertainment system 10 may include head unit 18 which is adapted to receive and read the audio/visual media discussed above. Video game console 20 may be electronically coupled to head unit 18, to thereby enable console 20 to indirectly receive audio/video media.

Video game console 20 may also be equipped with a voice activation unit (FIG. 2) to allow console 20 to be operated by the user's voice. In addition, console 20 may include a wireless connectivity device (FIG. 2) to allow console 20 to transmit and receive wireless communications, as described in further detail below.

Figure 3:
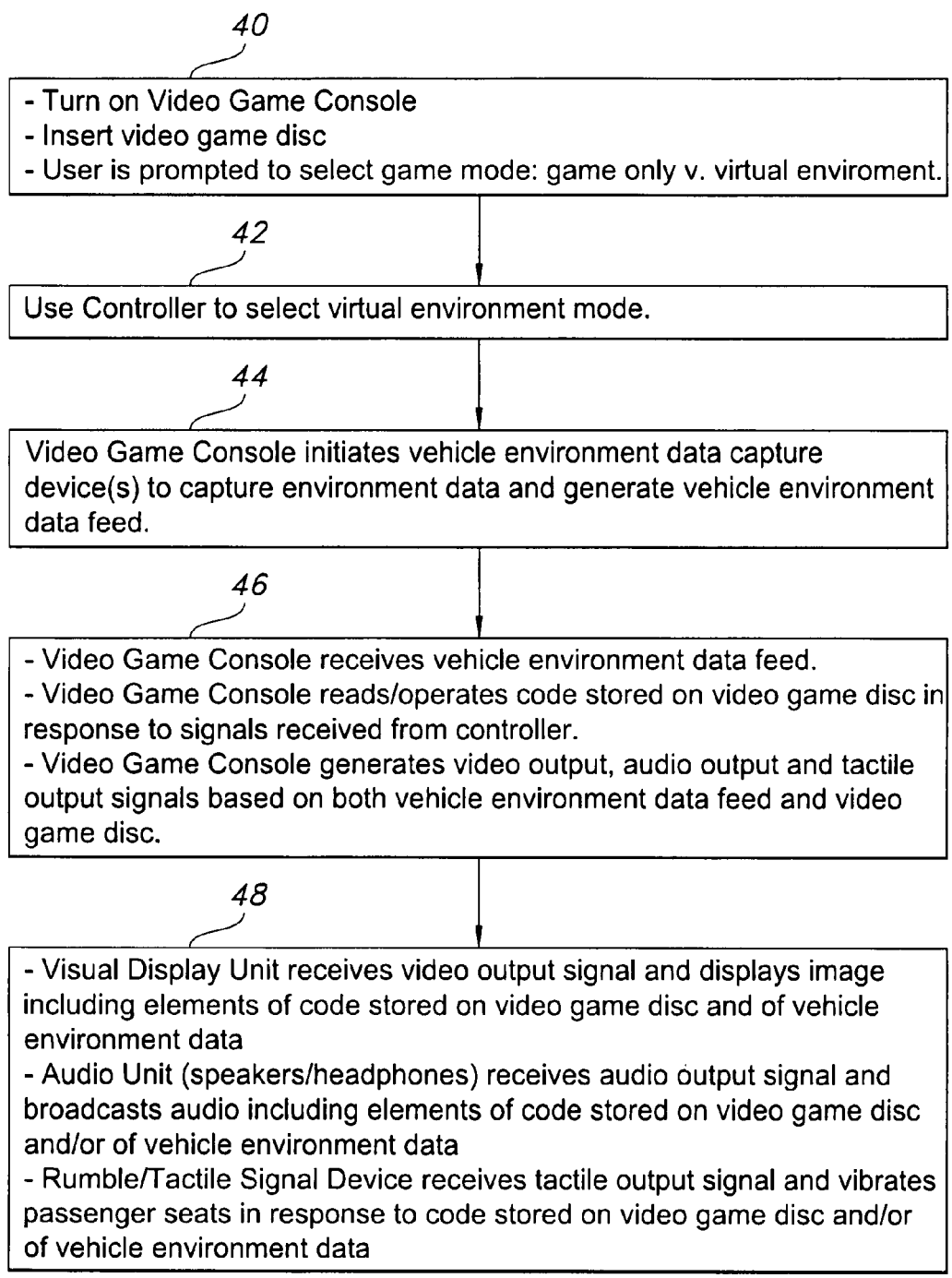
FIG. 3 is a flow chart illustrating one embodiment of the operation of the entertainment system of FIG. 1.

Referring to FIGS. 1 and 3, visual display unit 22 is electronically coupled to console 20, and may be electronically coupled to the application programming interface in particular. Visual display unit 22 may be in any known form. For example, visual display unit 22 may be in the form of a single, fold down flat panel screen mounted to the roof of vehicle 12. Alternatively, visual display unit 22 may be in the form of multiple display screens mounted in the headrests of front passenger seats 16 and rear passenger seats 14.

Visual display unit 22 may be electronically coupled to console 20 by either wireless or wired connections. The dashed lines of FIG. 1 are intended only to indicate an electronic connection and not the type of connection. In other words, the dashed lines of FIG. 1 indicate only that console 20 is electronically coupled to the other components of vehicle entertainment system 10 and not that such coupling is wired or wireless, is in series or in parallel, or has any other particular characteristic.

Referring still to FIGS. 1 and 2, controllers 24 may be electronically coupled to console 20. Controllers 24 may be in the form of any known video game controller and may include multi-directional buttons, joystick, thumbpad or buttons. Controllers 24 may be coupled to console 20 via wires or a wireless connection.

Referring still to FIGS. 1 and 2, as noted above, vehicle entertainment system 10 may also include vehicle environment sensor apparatuses, or "environmental sensors," 26 that may be electrically coupled to console 20. Each of the vehicle environment sensor apparatuses 26 may produce its own respective vehicle environment data feed. Sensor apparatus 26 is adapted to capture and transmit data relating to, or indicative of, vehicle 12 and its internal and external environment. Sensor apparatus 26 may include camera 26a mounted near the front of vehicle 12 and configured to capture real-time video images of the external surroundings of the vehicle. Sensor apparatus 26 may include multiple cameras, which may include night vision capability. Thus, entertainment system 10 may enable the vehicle's passengers to be visually aware of the vehicle's environment, even when there is no daylight and viewing the outside through the window is difficult. In one particular embodiment, camera 26a is mounted facing forward near the front bumper (not shown) or rearview mirror of vehicle 12 and is wide-angled to provide real-time video images of the view from front passenger seat 16 facing forward. Camera 26a generates a vehicle environment data feed including the real-time digital video images.

Additionally or alternatively, sensor apparatus 26 may include a navigational system built into console 20 and adapted to receive data from GPS satellite 26b. Console 20 may receive from GPS satellite 26b data relating to the environment of vehicle 12, such as three-dimensional mapping including city, state, road, building and attraction information relating to the location of vehicle 12.

Sensor apparatus 26 may include vehicle diagnostic system (DS) 26c and/or climate control system (CC) 26d. Vehicle diagnostic system 26c obtains data from vehicle sensors and provides a data feed that may include vehicle information such as speed of vehicle, distance traveled, headlights on/off, vehicle condition or any other vehicle features/conditions. Climate control system 26d may provide a data feed that includes the temperature outside and/or inside of vehicle 12.

Sensor apparatus 26 may include the capability of capturing video images of moving objects surrounding the vehicle, including, for example, pedestrians, animals, and other vehicles, such that the images of the moving objects may be incorporated into the operation and display of entertainment system 10. For instance, sensor apparatus 26 may include thermal imaging capability and/or video processing software that detects moving objects by comparing the positions of discrete objects within sequential video frames.

Sensor apparatus 26 may include the capability of detecting the heading direction in which the vehicle is traveling, such as through navigational data or through on-vehicle sensors. In one embodiment, the heading direction and/or speed of a virtual vehicle included in the game and/or video of entertainment system 10 may be programmed to follow or mimic the actual heading direction and/or speed of the actual vehicle in real-time in order to provide the user with a full-sensory entertainment experience. It is also possible for the outputs of on-vehicle sensors that track the various movements of the suspension system to be incorporated into the processing of the video/game.

Referring still to FIGS. 1 and 2, audio unit 32 is electronically coupled to console 20. Console 20, as discussed in further detail below, generates an audio output signal. Audio unit 32 is adapted to receive the audio output signal and produce or broadcast sound in response to the audio output signal. Audio unit 32 may be electronically coupled to console 20 by any means including, for example, a wired or wireless connection. Audio unit 32 may be in any form capable of producing sound. For instance, as illustrated in FIG. 1, audio unit 32 may be in the form of multiple speakers mounted throughout vehicle 12. Alternatively, audio unit 32 may be in the form of audio headphones or an audio headset.

Turning now to FIGS. 2-3, one embodiment of the operation of entertainment system 10 will now be described. As illustrated in step 40, the user may first turn on console 20 and insert a "video game medium", such as a video game disc. Console 20 may prompt the user to select a game mode by displaying a prompt on display unit 22. The prompt may ask the user to select between "game only" mode and "virtual environment" mode. As illustrated in step 42, the user uses controller 24 to select the game mode in a conventional manner. If the user selects "game only," then the processor and application program interface of console 20 cooperate to read and execute the video game media and communicate with visual display unit 22, audio unit 32 and controller 24 to allow the user to play the video media in the conventional manner. If the user selects "virtual environment" mode, as shown in step 42, video game console 20 initiates communication with sensor apparatuses 26 (step 44). Sensor apparatuses 26 capture data regarding the vehicle's environment, such as images of the area surrounding the vehicle, the speed of the vehicle, three-dimensional maps of the vehicle, the temperature and weather conditions and other data using camera 26a (FIG. 1), satellite 26b (FIG. 1), diagnostic system 26c (FIG. 1) and climate control system 26d (FIG. 1). By way of example, camera 26a obtains real-time video images of the road, buildings and other features in the vicinity of the vehicle as the vehicle travels. Camera 26a generates a vehicle environment data feed including these real-time video images.

As illustrated in step 46, video game console 20 may receive this data feed and, using the application program interface, may combine the video images of this data feed with the video images coded in the video game media. Generally, video game console 20 may generate video output, audio output and tactile output signals based upon both the vehicle environment data feed and processing of the software on the video game media, such as a disc. In a more specific embodiment, video game console 20 generates a video output signal based on both the data feed from camera 26a and the code of the game media. More generally, the video output signal may be at least partially based on any number of data feeds from any number of vehicle environment sensor apparatuses 26. Video game console 20 communicates the video output signal to video display unit 22, as illustrated in FIG. 2, and video display unit 22 displays images dependent upon the video output signal. Particularly, video display unit 22 may display an image based on both the virtual real-time video images and the video game media (see step 48 in FIG. 3). For instance, considering the video game PONG®, the image on video display unit 22 may include the interactive elements of PONG® superimposed on the real-time video images produced by camera 26a of the vehicle's surrounding environment. As the interactive PONG balls or cubes contact the buildings in the image, the buildings are damaged and the balls are bounced back. It is possible for the captured environment data to not just influence the image on the video display unit, but to also be used by the game processor in processing the results or score of the game. For example, the shape of a building captured from the surrounding environment may be displayed on video display unit 22 and may also be used by the processor to define the boundaries that a game player must "hit" with a virtual ball in order to have the ball bounce back and stay in play, which may garner the player additional points or favorable results within the context of the game.

Similarly, in the case of a painting program of a video game media, the interactive components of the painting game, such as a paint brush, may be superimposed over the real-time video images, thereby allowing users to virtually paint the passing landscape. In this case, the boundaries of the captured images may define the area of the display to which the virtual paint "sticks" or "adheres."

Simultaneously with the video output signal, the application program interface of video game console 20 generates an audio output signal and communicates the audio output signal to audio unit 32. The audio output signal may include processed data from the video game media and/or data from the data feed received from sensor apparatus 26.

Referring back to FIGS. 1 and 2, rear passenger seats 14 may be equipped with a tactile stimulation device 36 such as a rumble or vibration mechanism. Video game console 20, and the application programming interface in particular, may be electronically coupled to the rumble or vibration mechanism and may be adapted to produce a tactile stimulation signal in response to execution of the video game media. The tactile stimulation signal is received by the vibration mechanism, which causes rear passenger seats 14 to vibrate or rumble in response to action occurring on video display unit 22. Thus, the tactile stimulation device provides a passenger with a tactile sensation in response to the tactile stimulation signal.

Such tactile stimulations provided by entertainment system 10 may be directed at senses other than the sense of touch. For example, such tactile stimulations may be directed at a game player's sense of balance, his sense of the force of gravity, his sense of centripetal forces, or visceral senses.

Figure 4:
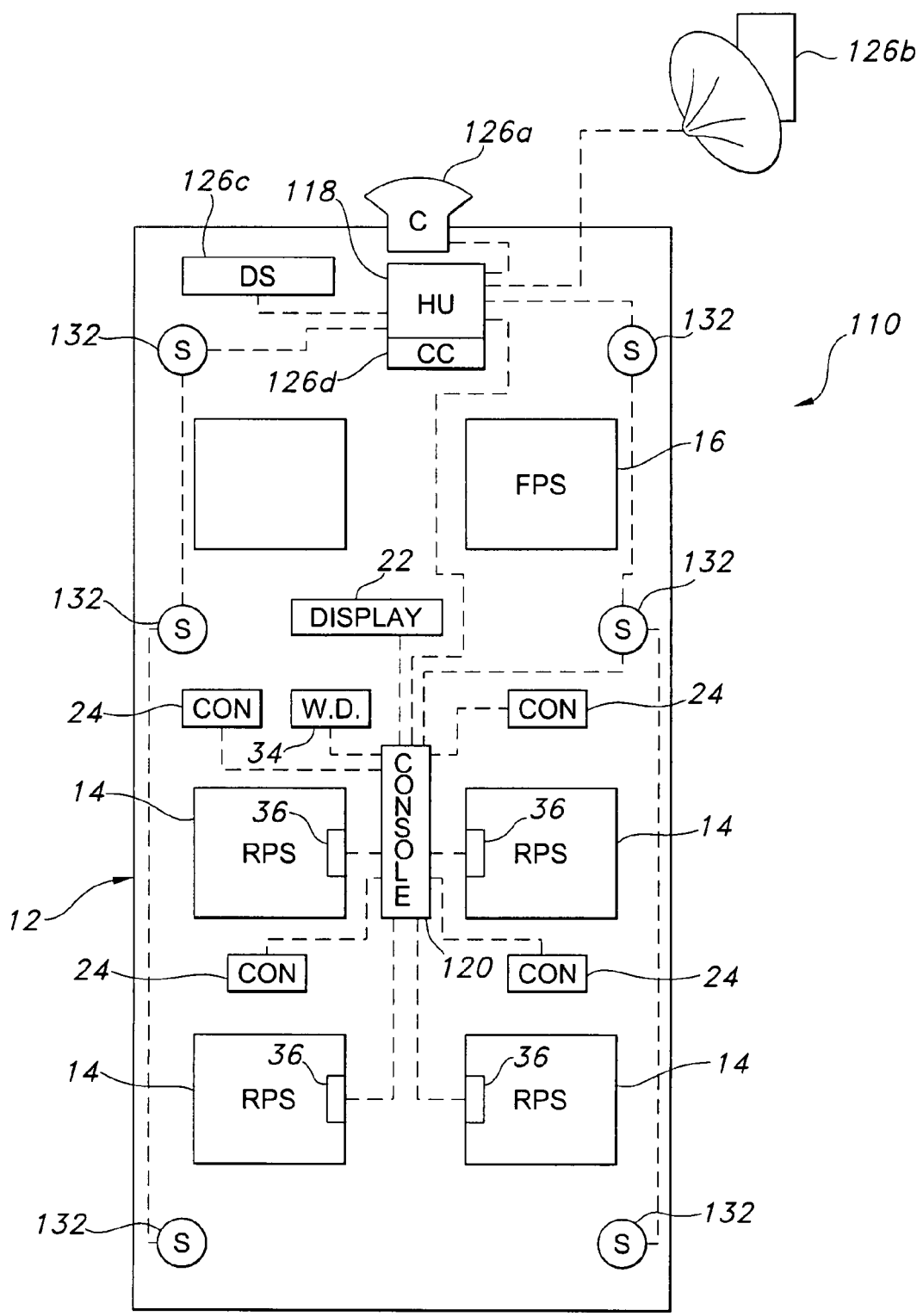
FIG. 4 is a block diagram of a vehicle having an entertainment system in accordance with another embodiment of the present invention.

The embodiment illustrated in FIG. 1 shows sensor apparatuses 26a-26d communicating directly with console 20, and shows audio units 32 coupled directly to console 20. However, in another embodiment as illustrated in FIG. 4, entertainment system 110 includes a console 120 that may communicate indirectly with audio units 132 and sensor apparatuses 126a-126d through head unit 118. Such an arrangement may facilitate the installation of entertainment system 110 in existing vehicles that already have one or more of sensor apparatuses 126a-126d.

Figure 5:
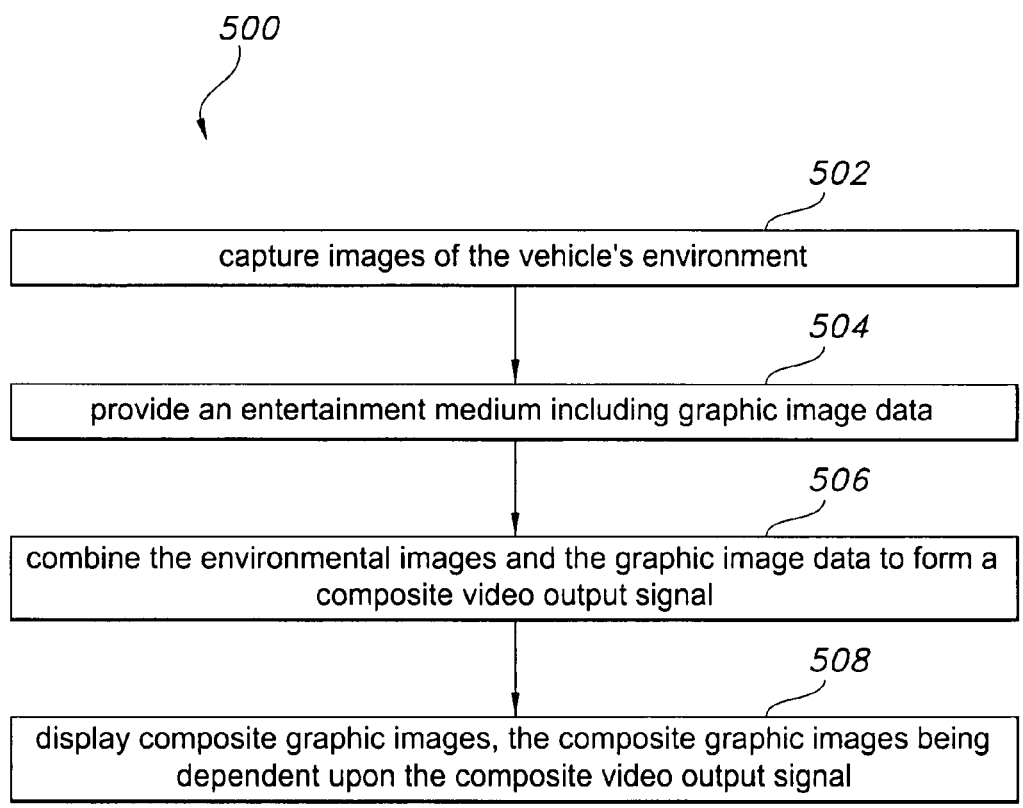
FIG. 5 is a flow chart illustrating one embodiment of a method of the present invention for operating an entertainment system in a vehicle.

One embodiment of a method 500 of the present invention for operating an entertainment system is illustrated in FIG. 5. In a first step 502, images of the vehicle's environment are captured. For example, camera 26a may be used to capture images of the environment surrounding the vehicle in real-time. The environmental images may include images of buildings, other vehicles, trees and other living beings, etc., that are surrounding the vehicle. Rather than, or in addition to, using a camera to capture surrounding images in real-time, it is also possible to use GPS to determine the location of the vehicle, and then download from a database satellite photograph images that are associated with the vehicle's location. In a next step 504, an entertainment medium including graphic image data is provided. The entertainment medium may provide either passive entertainment, such as a movie that the user watches, or interactive entertainment, such as a video game in which the user has some control and influence over images that are displayed on display 22. The entertainment medium may be in any of the forms listed at 30 in FIG. 2, for example, including video game software, on-line/web-access video games, or a video game system. The software may be stored on a hard disk within the vehicle, or may be stored on a portable storage device, such as a compact disc or memory stick, for example. The entertainment medium may include graphic image data that defines graphic images that may be displayed on display 22. It is also possible for the entertainment medium to include textual data that defines text characters that may be displayed on display 22, such as captions or information regarding a game.

In step 506, the environmental images and the graphic image data are combined to form a composite video output signal. That is, elements of the environmental images captured in step 502 and elements of the graphic image data from the entertainment medium may be combined to form a composite video output signal. Portions of the images of the environment surrounding the vehicle may be incorporated into the framework of the display scheme provided by the entertainment medium. In one particular embodiment, via known image processing algorithms, discrete objects in the environmental images are identified. For example, the group of pixels that forms the image of any discrete object in the environmental images, such as a building, person, vehicle, mountain, etc., is identified. The discrete object images may be extracted from the environmental images and combined with the graphic image data from the entertainment medium to form the composite video output signal. Elements of the graphic image data from the entertainment medium that are included in the composite video output signal may include background features, settings, characters, or game pieces, for example. Discrete object elements from the environmental images may be superimposed on or digitally integrated with background features and settings from the graphic image data from the entertainment medium to form the composite video output signal. Similarly, characters or game pieces from the graphic image data may be superimposed on or digitally integrated with the discrete objects from the environmental images to form the composite video output signal. In a final step 508, composite graphic images are displayed, the composite graphic images being dependent upon the composite video output signal. For example, display 22 may be used to display composite graphic images that are based upon the composite video output signal that is formed by combining the environmental images and the entertainment medium's graphic image data.

In one embodiment, the steps 502, 506 and 508 of capturing, combining and displaying, respectively, are performed in real-time. That is, captured images of objects surrounding the vehicle may be displayed by and integrated into the entertainment system while the objects are still in view of the vehicle's passengers through the windows of the vehicle. Thus, the user may remain aware of his present environment, even while being fully absorbed in the video game or video presentation provided by the entertainment system.

Figure 6A:
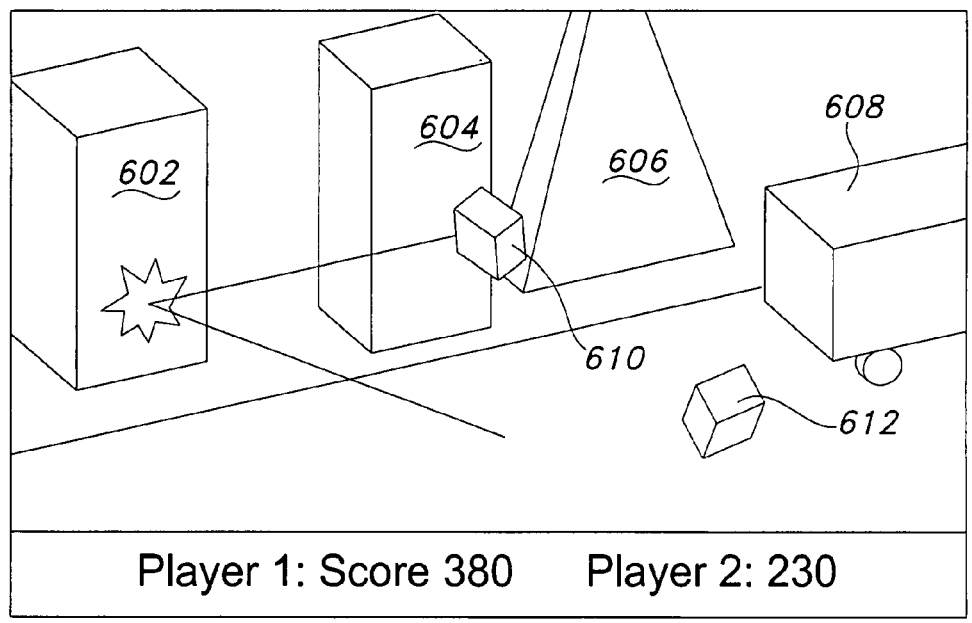
FIG. 6A is one embodiment of a video game display that may be produced by the entertainment system of the present invention.

It is possible, in a specific embodiment, for the environmental data to have an effect not just on the display or visual aspects of a video game, but to also have an effect on how the video game operates. Particularly, the environmental images or other types of environmental data may be used in calculating the playing parameters of the video game software. For example, FIG. 6A illustrates a video game screen display of a composite video image that may be produced by one embodiment of the present invention. The composite video image includes elements of environmental data in the form of captured video images of objects surrounding the vehicle in which the entertainment system operates. The environmental data includes images 602, 604, 606 of buildings, and an image 608 of a truck. The graphic image data from the entertainment medium includes images of game pieces 610, 612 that a player bounces off of images 602, 604, 606, 608 to thereby earn game points. The player may use one of controllers 24, for example, to control the movements of game pieces 610, 612. Thus, the size and placement of image elements 602, 604, 606, 608 from the environmental data affects whether a moving game piece 610, 612 bounces off of one of the image elements to garner points, or whether the game piece instead misses the image elements and continues movement out of the display screen, which does not earn points. Of course, the player sees on the display screen the size and placement of the image elements and controls the movement of the game pieces accordingly in an effort to hit the image elements with the game pieces.

Figure 6B:
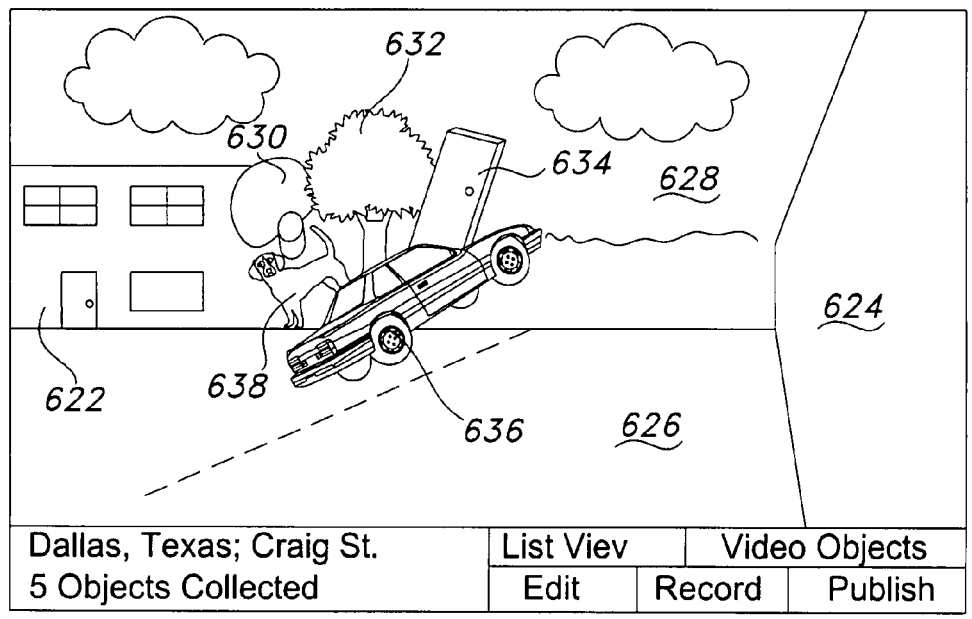
FIG. 6B is another embodiment of a video game display that may be produced by the entertainment system of the present invention.

FIG. 6B illustrates another video game screen display of a composite video image that may be produced by an embodiment of the present invention. The environmental data includes images of buildings 622, 624, a roadway 626 disposed therebetween, and a sky 628. In the particular embodiment shown, GPS is used to provide a text identification of the street on which the vehicle is traveling. The graphic image data from the entertainment medium includes images of game pieces 630, 632, 634, 636, 638 that a player may collect by spotting the game pieces within the display screen and clicking on the game pieces, or by selecting the game pieces in some other way. Each collected game piece may earn the player game points. Game pieces 630, 632, 634, 636, 638 include a basketball goal, a tree, a door, vehicle, and a dog, respectively.

The embodiment illustrated in FIG. 1 shows sensor apparatuses 26*a*-26*d* communicating directly with console 20, and shows audio units 32 coupled directly to console 20. However, in another embodiment as illustrated in FIG. 4, entertainment system 110 includes a console 120 that may communicate indirectly with audio units 132 and sensor apparatuses 126*a*-126*d* through head unit 118. Such an arrangement may facilitate the installation of entertainment system 110 in existing vehicles that already have one or more of sensor apparatuses 126*a*-126*d*.

As discussed above, the console may be equipped with a wireless communication device. Such a wireless communication device may be adapted to send video and audio output signals to and receive communication from a wireless device 34 such as a cellular phone, personal digital assistant (PDA) or other device. Thus, a passenger in front passenger seat 16 may use the display and user interface of the wireless device to play the games processed by console 20.

The entertainment system of the present invention provides an interactive gaming system that incorporates the surrounding view, location and other features of the vehicle's environment in the display and processing of the game, thereby creating an endless variety of arrangements of in-vehicle entertainment. While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An entertainment system for a vehicle, said entertainment system comprising:
    a vehicle environment sensor apparatus, said vehicle environment sensor apparatus being configured to capture data indicative of the vehicle's environment and generate a vehicle environment data feed;
    a video game console electronically coupled to said vehicle environment sensor apparatus and having an application program interface, said video game console being configured to:
        receive the vehicle environment data feed;
        operate a game medium; and
        generate a video output signal based on both the game medium and the vehicle environment data feed;
    at least one controller communicatively coupled to said video game console and adapted to direct the operation of the game medium; and
    a display unit communicatively coupled with said application program interface and configured to:
        receive the video output signal; and
        display images dependent upon the video output signal.

2. The entertainment system of claim 1 wherein said vehicle environment sensor apparatus includes a navigational system, said navigational system providing three-dimensional mapping of a location of the vehicle.

3. The entertainment system of claim 2 wherein said navigational system is adapted to communicate with global positioning system satellites to obtain the three-dimensional mapping.

4. The entertainment system of claim 1 wherein the vehicle has passenger seats, said entertainment system further including a tactile stimulation device electronically coupled to said video game console and adapted to be coupled to one of the passenger seats and to provide a passenger in the one passenger seat with a tactile sensation, said tactile stimulation device being configured to receive a tactile stimulation signal from said application program interface and provide the tactile sensation in response to the tactile stimulation signal.

5. The entertainment system of claim 1 wherein said application program interface is adapted to receive and read an audio storage medium.

6. The entertainment system of claim 1 including a plurality of vehicle environment sensor apparatuses configured to generate a plurality of vehicle environment data feeds, the video output signal being based on more than one of the vehicle environment data feeds.

7. An entertainment system for a vehicle, said entertainment system comprising:
    means for capturing and transmitting environmental data related to the vehicle's environment;
    an electronic module electronically coupled to said capturing means, said electronic module being configured to:
        receive the environmental data;
        operate an entertainment medium; and
        generate a video output signal based on both the entertainment medium and the environmental data; and
    a display unit communicatively coupled with said electronic module and configured to:
        receive the video output signal; and
        display images dependent upon the video output signal.

8. The entertainment system of claim 7 wherein said capturing means includes a GPS navigational system configured to provide three-dimensional mapping of a location of the vehicle.

9. The entertainment system of claim 7 wherein said capturing means includes a plurality of vehicle environment sensor apparatuses configured to generate a plurality of vehicle environment data feeds, said video output signal based on more than one of said plurality of vehicle environment data feeds.

10. The entertainment system of claim 7 further including an audio unit electronically coupled to said electronic module, said electronic module being configured to generate an audio output signal based on at least one of said entertainment medium and the environmental data, said audio unit receiving the audio output signal.

11. A method of operating an entertainment system for a vehicle, said method comprising the steps of:
    capturing images of the vehicle's environment;
    providing an entertainment medium including graphic image data;
    combining the environmental images and the graphic image data to form a composite video output signal; and
    displaying composite graphic images, the composite graphic images being dependent upon the composite video output signal.

12. The method of claim 11, wherein the capturing, combining and displaying steps are performed in real-time.

13. The method of claim 11, comprising the further step of calculating playing parameters of the video game software, said calculating being dependent upon the environmental images.

14. The method of claim 11, comprising the further steps of:
    identifying discrete objects in the environmental images; and
    extracting discrete object images from the environmental images, said combining step including combining the discrete object images and the graphic image data to form the composite video output signal.

15. The method of claim 13, wherein the environmental images comprise real-time images.

16. The system of claim 1, wherein the video game console is configured to generate a plurality of video output images included in the video output signal, each of the images being based on both the game medium and the vehicle environment data feed.

17. The system of claim 7, wherein the environmental data comprises real-time video images captured by a camera, the entertainment medium comprising a game medium, said electronic module being configured to generate a plurality of video output images included in the video output signal, each of the images including at least one interactive element of the game medium superimposed on the real-time video images captured by the camera.

18. The method of claim 11, wherein the entertainment medium comprises a game medium having a game processor, the method comprising the further step of the game processor using the environmental images in processing results of a game or a score of a game.

19. The method of claim 18, wherein each of the composite graphic images includes at least one element of the graphic image data and at least one element of the environmental images, the combining step including changing a position of at least one said element of the graphic image data within consecutive said composite graphic images, the changing being in response to an electronic input from a user.

20. The method of claim 11, wherein each of the composite graphic images includes at least one element of the environmental images superimposed on the graphic image data.

* * * * *